(12) United States Patent
Cho et al.

(10) Patent No.: US 10,573,063 B2
(45) Date of Patent: Feb. 25, 2020

(54) CONTENT VISUALIZING DEVICE AND METHOD

(71) Applicant: SAMSUNG ELECTRONICS CO., LTD., Suwon-si (KR)

(72) Inventors: Yang Ho Cho, Seongnam-si (KR); Dong Kyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/981,385

(22) Filed: May 16, 2018

(65) Prior Publication Data

US 2019/0139298 A1  May 9, 2019

(30) Foreign Application Priority Data

Nov. 8, 2017 (KR) .................. 10-2017-0148017

(51) Int. Cl.
| | |
|---|---|
| *G06T 15/20* | (2011.01) |
| *G06T 7/70* | (2017.01) |
| *G06T 7/50* | (2017.01) |
| *G06T 19/20* | (2011.01) |
| *G02B 27/01* | (2006.01) |
| *B60K 35/00* | (2006.01) |
| *G06T 19/00* | (2011.01) |

(52) U.S. Cl.
CPC ............ *G06T 15/205* (2013.01); *B60K 35/00* (2013.01); *G02B 27/0101* (2013.01); *G02B 27/0179* (2013.01); *G06T 7/50* (2017.01); *G06T 7/70* (2017.01); *G06T 19/006* (2013.01); *G06T 19/20* (2013.01); *B60K 2350/2052* (2013.01); *B60K 2350/352* (2013.01); *B60K 2370/334* (2019.05); *B60K 2370/52* (2019.05); *G02B 2027/014* (2013.01); *G02B 2027/0185* (2013.01); *G06T 2207/30252* (2013.01); *G06T 2219/2016* (2013.01); *G06T 2219/2021* (2013.01)

(58) Field of Classification Search
CPC ............... G02B 27/01; G02B 27/0101; G02B 2027/0138; G02B 2027/0127; G02B 2027/0141; G02B 2027/0187; G02B 2027/0134; G02B 2027/014; G02B 2027/0181; G02B 27/0938; G06T 19/006; G06T 19/20; G06T 2207/10028; G06T 2207/30261; G06T 7/20; B60K 35/00; B60R 2300/205; B60R 2300/308
USPC ......................................................... 345/419
See application file for complete search history.

(56) References Cited

U.S. PATENT DOCUMENTS

| | | | |
|---|---|---|---|
| 2012/0050138 A1* | 3/2012 | Sato ................. | B60K 35/00 345/4 |
| 2013/0181823 A1 | 7/2013 | Ståhlin et al. | |
| 2014/0362195 A1* | 12/2014 | Ng-Thow-Hing ............ G06K 9/00791 348/51 |

(Continued)

FOREIGN PATENT DOCUMENTS

| | | |
|---|---|---|
| JP | 2009-288388 A | 12/2009 |
| JP | 2014-181025 A | 9/2014 |

(Continued)

*Primary Examiner* — Hilina K Demeter
(74) *Attorney, Agent, or Firm* — Sughrue Mion, PLLC

(57) ABSTRACT

A content visualizing device and method that may adjust content based on a distance to an object so as to maintain a projection plane and prevent an overlap with the object in front is provided.

16 Claims, 13 Drawing Sheets

(56) References Cited

U.S. PATENT DOCUMENTS

| | | | | |
|---|---|---|---|---|
| 2015/0312327 | A1* | 10/2015 | Fowe | G06K 9/00785 |
| | | | | 701/23 |
| 2015/0344032 | A1* | 12/2015 | Oh | B60W 30/16 |
| | | | | 701/37 |
| 2016/0054563 | A9* | 2/2016 | Fujimura | G02B 27/0101 |
| | | | | 359/630 |
| 2016/0086042 | A1 | 3/2016 | Enz et al. | |
| 2016/0086305 | A1* | 3/2016 | Watanabe | G01P 1/08 |
| | | | | 345/672 |
| 2017/0085847 | A1* | 3/2017 | Kurosawa | H04N 9/3185 |
| 2017/0089710 | A1* | 3/2017 | Slusar | B60R 1/00 |
| 2017/0220106 | A1* | 8/2017 | Tomiyama | B60J 1/02 |
| 2017/0309049 | A1* | 10/2017 | Law | H04N 13/275 |
| 2017/0336629 | A1* | 11/2017 | Suzuki | G08G 1/161 |
| 2018/0066956 | A1 | 3/2018 | Kim | G01C 21/3682 |
| 2018/0089899 | A1* | 3/2018 | Piemonte | G01C 21/365 |
| 2018/0330531 | A1* | 11/2018 | Mullins | G06T 3/4092 |
| 2018/0354509 | A1* | 12/2018 | Mullins | G02B 27/01 |

FOREIGN PATENT DOCUMENTS

| | | |
|---|---|---|
| KR | 10-1409846 B1 | 6/2014 |
| KR | 10-2015-0109212 A | 10/2015 |
| KR | 10-1628688 B1 | 6/2016 |
| KR | 10-2017-0055091 A | 5/2017 |

* cited by examiner

CONTENT VISUALIZING DEVICE AND METHOD

CROSS-REFERENCE TO RELATED APPLICATION

This application claims priority from Korean Patent Application No. 10-2017-0148017, filed on Nov. 8, 2017 in the Korean Intellectual Property Office, the disclosure of which is incorporated herein by reference in its entirety.

BACKGROUND

1. Field

Methods and apparatuses consistent with exemplary embodiments relate to a content visualizing device and method.

2. Description of the Related Art

To assist driving of vehicles and other means of transportation, augmented reality (AR) representing a variety of visual information is provided through displays or navigation systems mounted on the vehicles. For example, there have been attempts to match the visual information to actual driving information through an AR-based head-up display (HUD) or to display a virtual image at a fixed position.

SUMMARY

One or more exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a content visualizing device, comprising: an object detector configured to detect an object in front of the object detector; and a processor configured to adjust a characteristic of content to be displayed in a 3-dimensional (3D) space through a head-up display (HUD) based on a distance from the object detector to the object.

The processor maybe further configured to adjust a depth at which the content is to be visualized based on the distance from the object detector to the object.

The processor maybe further configured to limit a depth at which the content is to be visualized to be less than the distance from the object detector to the object.

The content visualizing device may further comprise: the HUD configured to form a projection plane, and the processor maybe further configured to determine a depth at which the content is to be visualized based on the projection plane.

The processor maybe further configured to: adjust, in a first region in which the object is detected, a depth at which the content is to be visualized, and maintain, in a second region in which the object is not detected, the depth at which the content is to be visualized.

The processor maybe further configured to change a region in which the content is to be visualized in response to at least one of a change in the distance from the object detector to the object and a horizontal movement of the object.

The processor maybe further configured to change at least one of a position, a size, and a shape of the content based on vehicle information of a vehicle, in response to the content visualizing device being mounted on the vehicle.

The processor maybe further configured to predict a movement of the object, and gradually change at least one of a position, a depth, a size, and a shape of the content based on the predicted movement.

The object detector may comprise a depth sensor configured to measure the distance from the content visualizing device to the object.

The processor maybe further configured to: change a depth at which the content is to be visualized with respect to a first region corresponding to a first lane on which the object is positioned, in response to the content visualizing device being mounted on a vehicle, and maintain the depth at which the content is to be visualized with respect to a second region corresponding to a second lane different from the first lane.

According to aspect of an another embodiment, there is provided a content visualizing method, comprising: detecting, by an object detector, an object in front of the object detector; and adjusting a characteristic of content to be displayed in a 3-dimensional (3D) space through a head-up display (HUD) based on a distance from the object detector to the object.

The adjusting the content may comprise adjusting a depth at which the content is to be visualized based on the distance from the object detector to the object.

The adjusting the content may comprise limiting a depth at which the content is to be visualized to be less than the distance from the object detector to the object.

The adjusting the content may comprise: forming a projection plane through the HUD; and determining a depth at which the content is to be visualized based on the projection plane.

The adjusting the content may comprise: adjusting, in a first region in which the object is detected, a depth at which the content is to be visualized; and maintaining, in a second region in which the object is not detected, the depth at which the content is to be visualized.

The adjusting the content may comprise changing a region in which the content is to be visualized in response to at least one of a change in the distance from the object detector to the object and a horizontal movement of the object.

The adjusting the content may comprise changing at least one of a position, a size, and a shape of the content based on vehicle information of a vehicle.

The adjusting the content may comprise predicting a movement of the object, and gradually changing at least one of a position, a depth, a size, and a shape of the content based on the predicted movement.

The detecting the object may comprise measuring the distance from the object detector to the object.

The adjusting the content may comprise: changing a depth at which the content is to be visualized with respect to a first region corresponding to a first lane on which the object is positioned; and maintaining the depth at which the content is to be visualized with respect to a second region corresponding to a second lane different from the first lane.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
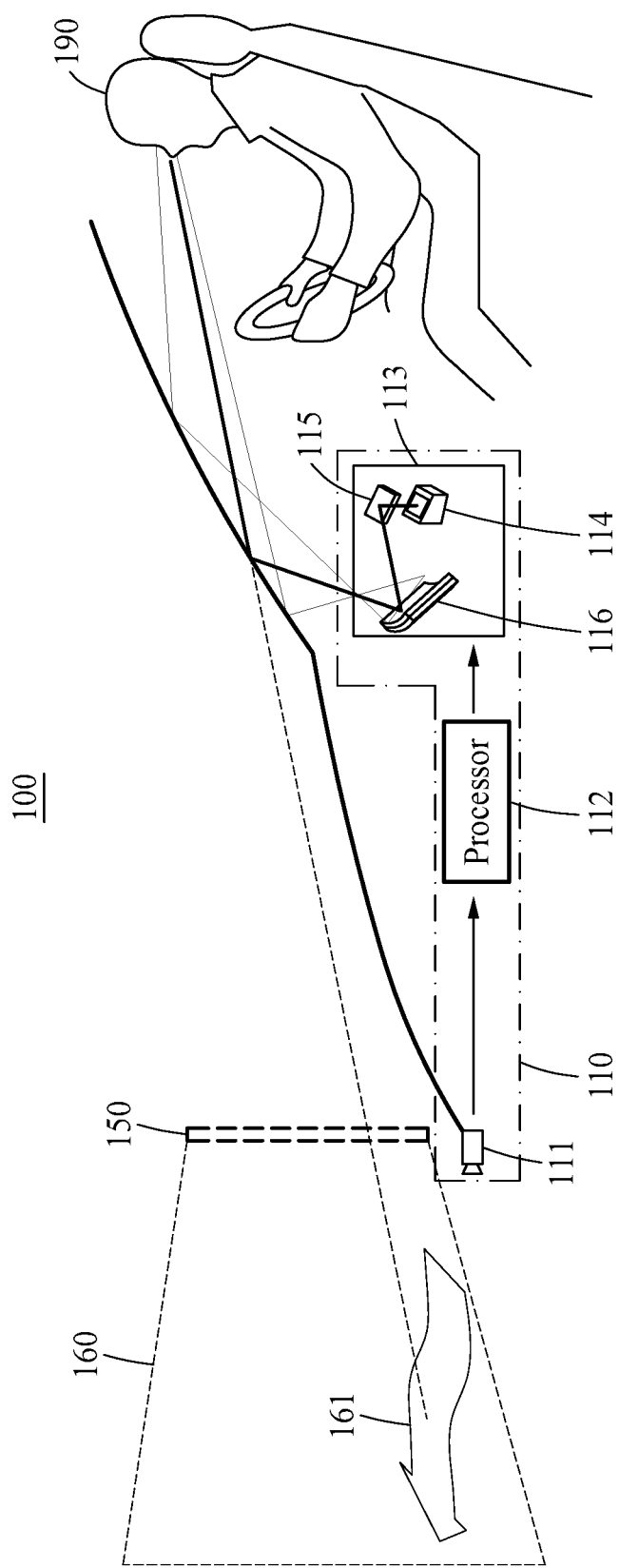
FIG. 1 illustrates a content visualizing system according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

The following structural or functional descriptions are exemplary to merely describe the exemplary embodiments, and the scope of the exemplary embodiments is not limited to the descriptions provided in the present specification. Various changes and modifications can be made thereto by those of ordinary skill in the art.

As used herein, the singular forms are intended to include the plural forms as well, unless the context clearly indicates otherwise. It should be further understood that the terms "comprises," comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Also, in the description with reference to the accompanying drawings, the same elements will be designated by the same reference numerals, wherever possible, even though they are shown in different drawings, and thus duplicate description thereof will be omitted. In the description of embodiments, detailed description of well-known related structures or functions will be omitted when it is deemed that such description will cause ambiguous interpretation of the present disclosure.

FIG. 1 illustrates a content visualizing system according to an exemplary embodiment.

A content visualizing system 100 may refer to a system configured to provide a user 190 with content 161 using a content visualizing device 110 mounted on an apparatus.

Referring to FIG. 1, the content visualizing device 110 may include an object detector 111, a processor 112, and a head-up display (HUD) 113.

The object detector 111 may detect an object in front of the vehicle. For example, the object detector 111 may measure a distance to the object in front of the vehicle. Further, the object detector 111 may capture environments in front, in rear, on left, and on right of a vehicle.

The processor 112 may generate the content 161 to be provided to the user 190 based on the detected object. For example, in a case in which the content visualizing device 110 is mounted on the vehicle, the content visualizing device 110 may generate the content 161 based on information related to driving, and provide the user 190 with the content 161. The content 161 may be data to provide the user 190 with information related to driving. The driving information may be information necessary for a driver, for example, a steady speed driving guide, navigation information, and a current driving velocity. Further, the processor 112 may model the object, detect a position of the object, or recognize the object by analyzing surrounding information, for example, a distance to a surrounding object and an image including the surrounding object, sensed by the object detector 111.

The HUD 113 may visualize the content 161 in a visible region positioned in front of the user 190. For example, the HUD 113 may visualize the content 161 on a window disposed in front of the user 190, for example, a windshield of the vehicle. The HUD 113 may form a virtual projection plane 150. The projection plane 150 may be a plane on which a virtual image including the content 161 generated by the HUD 113 is displayed. The user 190 may recognize the virtual image displayed on the projection plane 150.

Further, the HUD 113 may visualize the content 161 having a depth on the projection plane 150. For example, the processor 112 may determine a depth at which the content 161 is to be visualized based on the projection plane 150, and the HUD 113 may visualize, based on the determined depth, the content 161 to have a depth which is relatively far away from or close to the projection plane 150 and the user 190. The HUD 113 may visualize the content 161 having the corresponding depth in a virtual region 160 on the projection plane 150. Here, the processor 112 may render the content 161 to be a three-dimensional (3D) graphic representation based on an optical system of the HUD 113. The 3D graphic representation may express a stereoscopic graphic representation having a depth. The HUD 113 may form the projection plane 150 including a left image and a right image based on the depth of the content 161, and provide the left image to a left eye of the user 190 and the right image to a right eye of the user 190 through the projection plane 150. Thus, the user 190 may recognize the depth of the stereoscopically rendered content 161.

The HUD 113 may include, for example, a picture generator 114, a fold mirror 115, and a concave mirror 116. However, the configuration of the HUD 113 is not limited thereto, and may include various components to form the projection plane 150 on which a virtual image is focused through projection toward the window in front of the user 190.

Although an example in which the content visualizing device 110 is mounted on a vehicle is described herein, embodiments are not limited thereto. For example, the content visualizing device 110 may be applied to technology that combines information of a real world and information of a virtual world, for example, augmented reality (AR) glasses or mixed reality (MR).

The content visualizing device 110 may continuously express the depth by adjusting the depth of the content 161, without changing a position of the projection plane 150 formed by the HUD 113. Further, since a change of the position of the projection plane 150 is not needed, the content visualizing device 110 may not require a physical control of the elements included in the HUD 113. In a case in which the content visualizing device 110 is mounted on a vehicle, the content visualizing device 110 may dynamically visualize the 3D content 161 in front of a driver.

In addition, the content visualizing device 110 may continuously express the depth through the HUD 113, and visualize the content 161 having a depth of hundreds of meters ahead of the user 190. However, in a case in which an object, for example, another vehicle or a pedestrian, cuts in between the user 190 and the content 161 visualized to have a depth, an overlap between a 3D graphic representation corresponding to the content 161 visualized to have a depth and the object that cuts in may occur. The overlap may cause visual fatigue of the user 190, or cause a crosstalk such that the user 190 may recognize an unnatural image.

The content visualizing device 110 may adjust the content 161 to be visualized more naturally. An operation of the content visualizing device 110 will be described further below.

Figure 2:
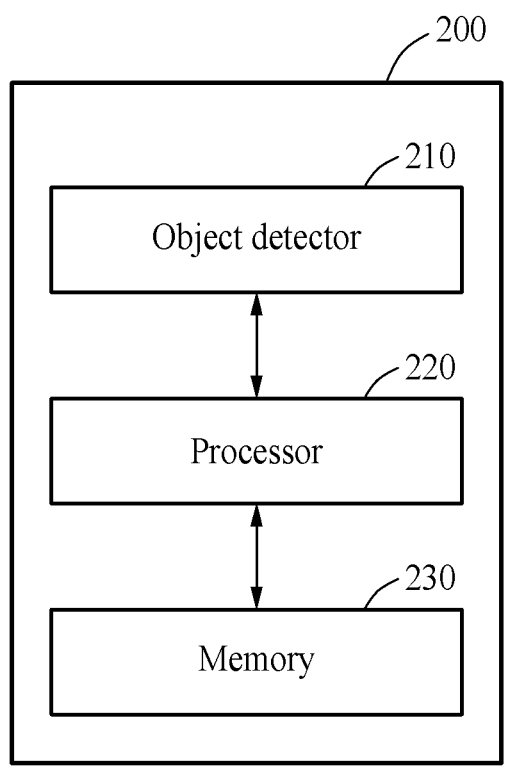
FIGS. 2 and 3 are block diagrams illustrating configurations of content visualizing devices according to an exemplary embodiment.
Figure 3:
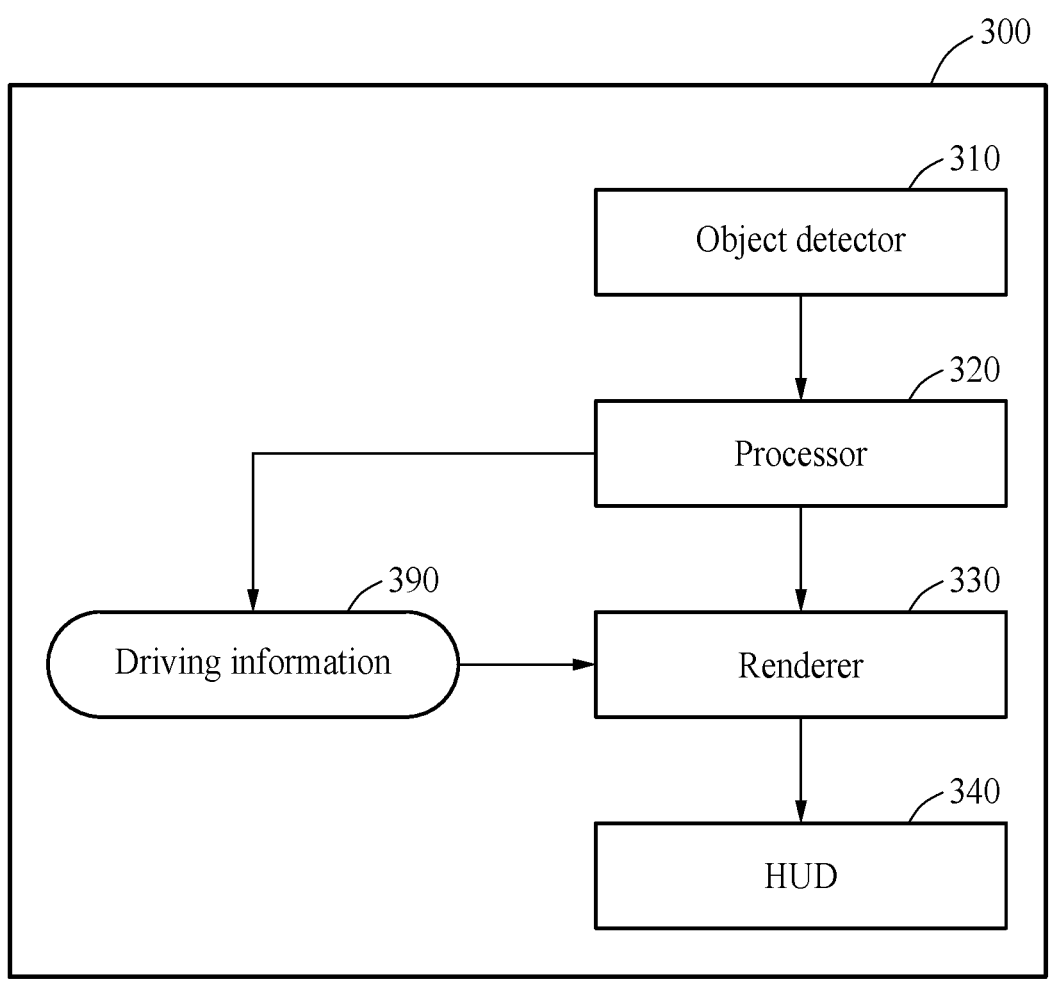

FIGS. 2 and 3 are block diagrams illustrating configurations of content visualizing devices according to an exemplary embodiment.

FIG. 2 illustrates a configuration of a content visualizing device 200.

Referring to FIG. 2, the content visualizing device 200 may include an object detector 210, a processor 220, and a memory 230.

The object detector 210 may detect an object in front of the vehicle. Further, the object detector 210 may detect an object in a vicinity of a user. In an example, the object detector 210 may detect an object in a vicinity of an apparatus on which the content visualizing device 200 is mounted. For example, the object detector 210 may include a depth sensor configured to measure a distance from the content visualizing device 200 to the object. The depth sensor may be implemented using a radio detecting and ranging (RADAR) module, or a light detection and ranging (LIDAR) module. Further, the object detector 210 may detect or identify a shape of the object.

The processor 220 may adjust content to be visualized through an HUD based on the distance to the object. In an example, the processor 220 may adjust a depth at which the content is to be visualized based on the distance from the content visualizing device 200 to the object. The processor 220 may determine the depth at which the content is to be visualized based on a projection plane. For example, the processor 220 may limit the depth at which the content is to be visualized to be less than the distance from the content visualizing device 200 to the object. Thus, the processor 220 may prevent a crosstalk that may occur when content having a depth is visualized beyond the detected object, or when the content is visualized to overlap an object in a 3D space.

Further, in a case in which a plurality of object are in the vicinity, the processor 220 may generate a distance map of surrounding environments from distances to the plurality of objects detected by the object detector 210.

The memory 230 may store information to be used to visualize the content. For example, the memory 230 may store driving information and the content.

In addition, the content visualizing device 200 may interoperate with an advanced driver assistance system (ADAS) for a vehicle to visualize content for improving driving convenience. The content visualizing device 200 may prevent an overlap with the object by changing a position, a depth, and a size of the content based on a distance to the detected object in front of the vehicle, a velocity of the vehicle on which the content visualizing device 200 is mounted, and a direction of the vehicle. In a case in which an overlap is predicted, the content visualizing device 200 may gradually change the content.

FIG. 3 illustrates another configuration of a content visualizing device.

Referring to FIG. 3, a content visualizing device 300 may include an object detector 310, a processor 320, a renderer 330, and an HUD 340.

The content visualizing device 200 of FIG. 2 may generate natural content without causing visual fatigue, and render the content to be a 3D graphic representation using software. However, exemplary embodiments are not limited thereto. As shown in FIG. 3, the renderer 330 may be implemented as a separate chip.

The object detector 310 may detect an object in front of a user, and perform the operation as described with reference to FIG. 2. For example, the object detector 310 may include a camera, for example, a multi-camera, a LIDAR, a RADAR, and a depth sensor, and may detect an image or a depth with respect to an external environment of a vehicle.

The processor 320 may determine a depth at which content is to be visualized based on a distance to the object. For example, the processor 320 may determine the depth at which the content is to be visualized based on driving information 390. The processor 320 may measure or estimate the depth from information sensed by the object detector 310, and match map information and the sensed information. Further, the processor 320 may determine a current position of the vehicle, and detect or recognize a surrounding object, for example, a lane line, a traffic sign, another vehicle, or a pedestrian, thereby interpreting and modeling a space in a vicinity of the vehicle. The processor 320 may determine whether an overlap between the content and the object, other than a road, occurs, and determine the depth at which the content is to be visualized.

The renderer 330 may render the content to be a 3D graphic representation. For example, the renderer 330 may project the 3D graphic representation corresponding to the content on a projection plane through the HUD 340. The renderer 330 may render the content in an actual image environment based on information processed by the processor 320. The renderer 330 may render the content to be the 3D graphic representation without causing visual fatigue based on the driving information 390 of the vehicle and actual image environment information interpreted by the processor 320.

Figure 4:
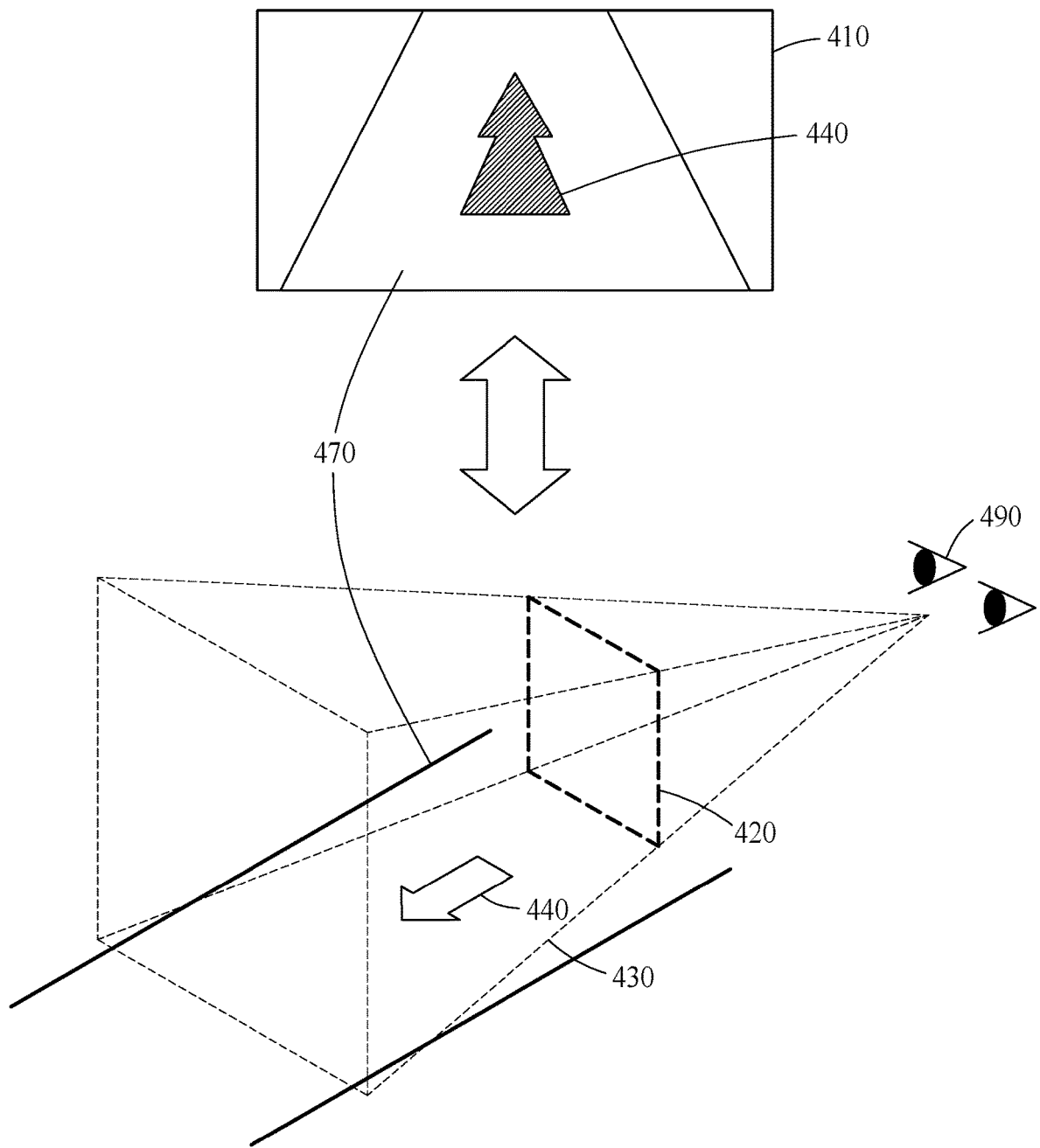
FIG. 4 illustrates content visualized through a head-up display (HUD) according to an exemplary embodiment.

FIG. 4 illustrates content visualized through an HUD according to an exemplary embodiment.

For ease of description, FIG. 4 illustrates a visual field 410 of a user 490 corresponding to a limited field of view (FOV).

However, exemplary embodiments are not limited thereto. As shown in FIG. 4, the user 490 may simultaneously recognize an actual road 470 and content 440 visualized by a content visualizing device. In a case in which the content visualizing device is mounted on a vehicle, the content 440 corresponding to driving information may be implemented as a graphic representation of an arrow indicating a direction in which the vehicle is to proceed, as shown in FIG. 4.

The content visualizing device may visualize the content 440 to be a 3D graphic representation on the actual road 470. The content 440 may be visualized to be a 3D graphic representation having a continuous depth of hundreds of meters ahead of the user 490.

The content visualizing device may focus a virtual image on a projection plane 420 through an HUD, thereby providing the user 490 with an image including the content 440. For example, the content visualizing device may provide a left image to a left eye of the user 490 and a right image to a right eye of the user 490, thereby visualizing the content 440 in a form of a stereoscopic graphic representation.

Further, the content visualizing device may visualize the content 440 to have a depth in a virtual region 430. The content 440 may be represented to be mixed with an object and a background of a real world. The content visualizing device may provide a left image including the content 440 and a right image including the graphic representation corresponding to the content 440 on the projection plane 420, and the user 490 may recognize a different depth of the content 440 based on a disparity between the graphic representation included in the left image and the graphic representation included in the right image. The virtual region 430 may be a region in which the content 440 may be disposed, the region having a depth, and may define a limit of a 3D space in which the content 440 is visualized stereoscopically.

For example, the content visualizing device may visualize the content 440 having a depth through the projection plane 420 in the virtual region 430 corresponding to a front side of the projection plane 420. The user 490 may recognize the content 440 as being overlaid on the actual road 470. Thus, the content visualizing device may visualize the content 440 having a depth to be mixed with the background of the real world.

Figure 5:
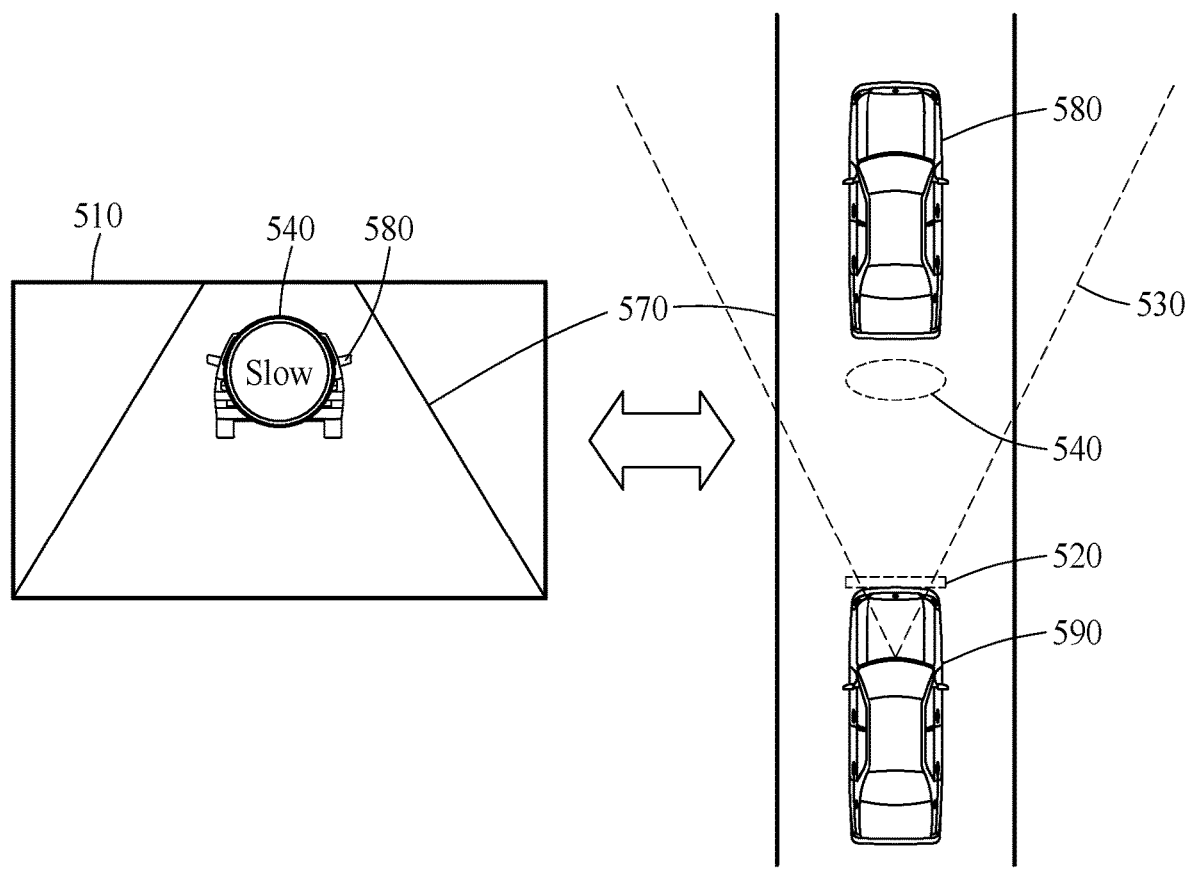
FIGS. 5 and 6 illustrate examples of visualized content according to an exemplary embodiment.
Figure 6:
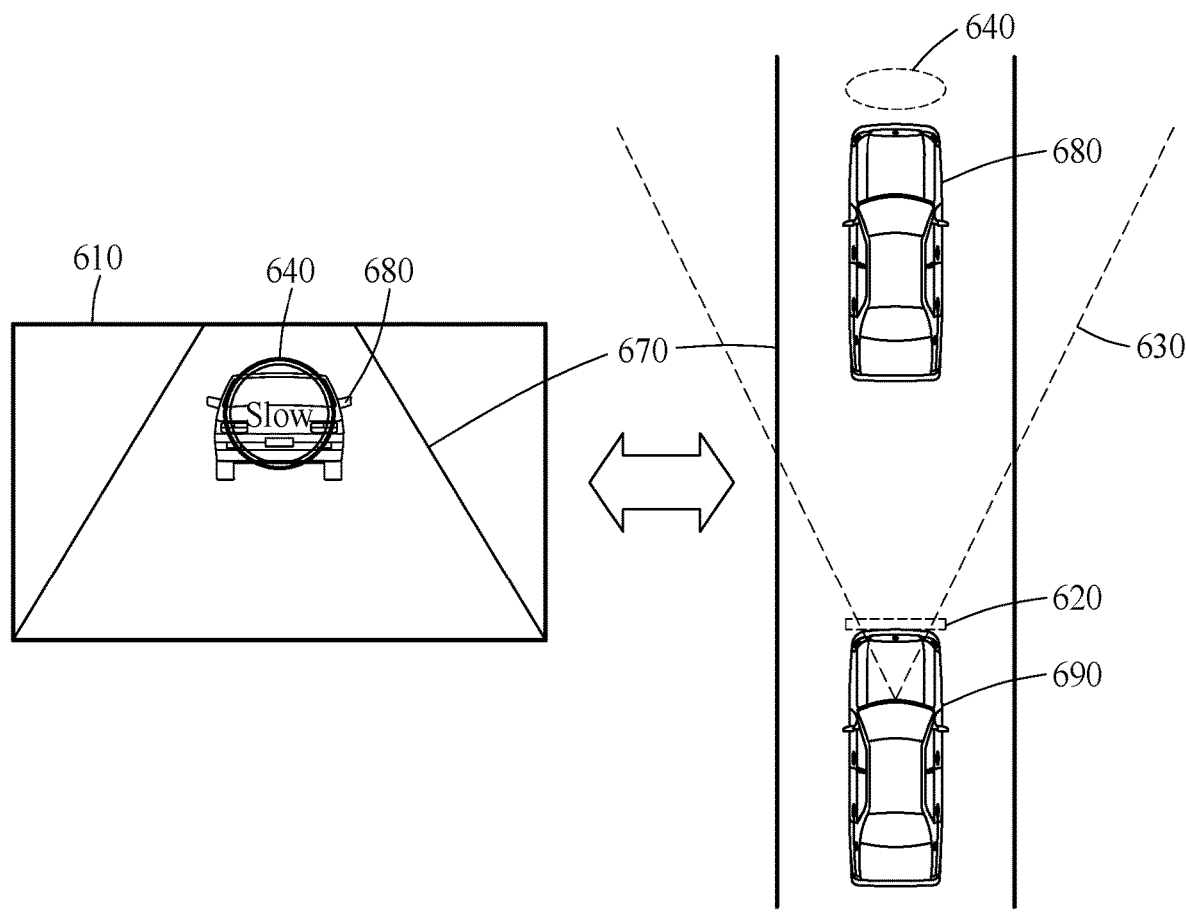

FIGS. 5 and 6 illustrate examples of visualized content according to an exemplary embodiment.

FIGS. 5 and 6 describe a crosstalk prevented by a content visualizing device. FIGS. 5 and 6 illustrate content 540, 640 visualized in a situation in which a preceding object 580, 680 is in front of a vehicle 590, 690. FIGS. 5 and 6 assume that a situation in which the vehicle 590, 690 being driven on a road 570, 670 is close to the preceding object 580, 680, or a velocity of the vehicle 590, 690 is relatively fast. The content 540, 640 provided to a user may include an indication indicating that the vehicle 590, 690 should slow down.

In an example of FIG. 5, a content visualizing device may detect the preceding object 580, and adjust the content 540 to have a depth less than a distance to the preceding object 580 in a virtual space 530. The content 540 may be provided to the user as a stereoscopic image through a projection plane 520 formed through an HUD. The content visualizing device may visualize the content 540 to have a depth in the virtual space 530 between the preceding object 580 and the vehicle 590. As shown on a left side of FIG. 5, the user may recognize the content 540 as being overlaid behind the preceding object 580. Since a distance between the content 540 and the user is less than the distance between the preceding object 580 (see right side of FIG. 5) and the user, the content 540 may obscure the preceding object 580 in a visual field 510 of the user. Since the content 540 and the preceding object 580 do not spatially overlap, the content visualizing device may prevent a crosstalk.

However, in a comparative situation illustrated in FIG. 6, in which, the preceding object 680 cuts in front of the vehicle 690 being driven, or the vehicle 690 moves to another lane, an overlap between the content 640 and the preceding object 680 may occur, which may cause a crosstalk to the user. For example, as shown in the right side of FIG. 6, a distance between the content 640 visualized in a virtual space 630 and the vehicle 690 may be greater than a distance between the preceding object 680 and the vehicle 690. The content 640 visualized through a projection plane 620 may need to be visualized to be deeper than the preceding object 680, and thus the content 640 should be obscured by the preceding object 680. However, as shown in left side of FIG. 6, the content 640 that is supposed to be obscured and thus not to be visualized may overlap the preceding object 680. That is, the content 640 that should not be viewed in reality due to a distance difference may be recognized in a visual field 610 of the user along with the preceding object 680, and thus the user may experience a recognition mismatch resulting from a distance confusion. Furthermore, in a case in which the depth of the content 640 is similar to the distance to the preceding object 680, the user may also experience a recognition mismatch similar to the example described above. Such a recognition mismatch may interrupt an intended depth, and cause visual fatigue to the user.

Accordingly, as shown in FIG. 5, the content visualizing device may visualize the content 540, such that a distance between the content 540 and the user is less than the distance between the preceding object 580, so as to avoid situations illustrated in comparative FIG. 6 and prevent the overlap between the content 540 and the preceding object 580.

Figure 7:
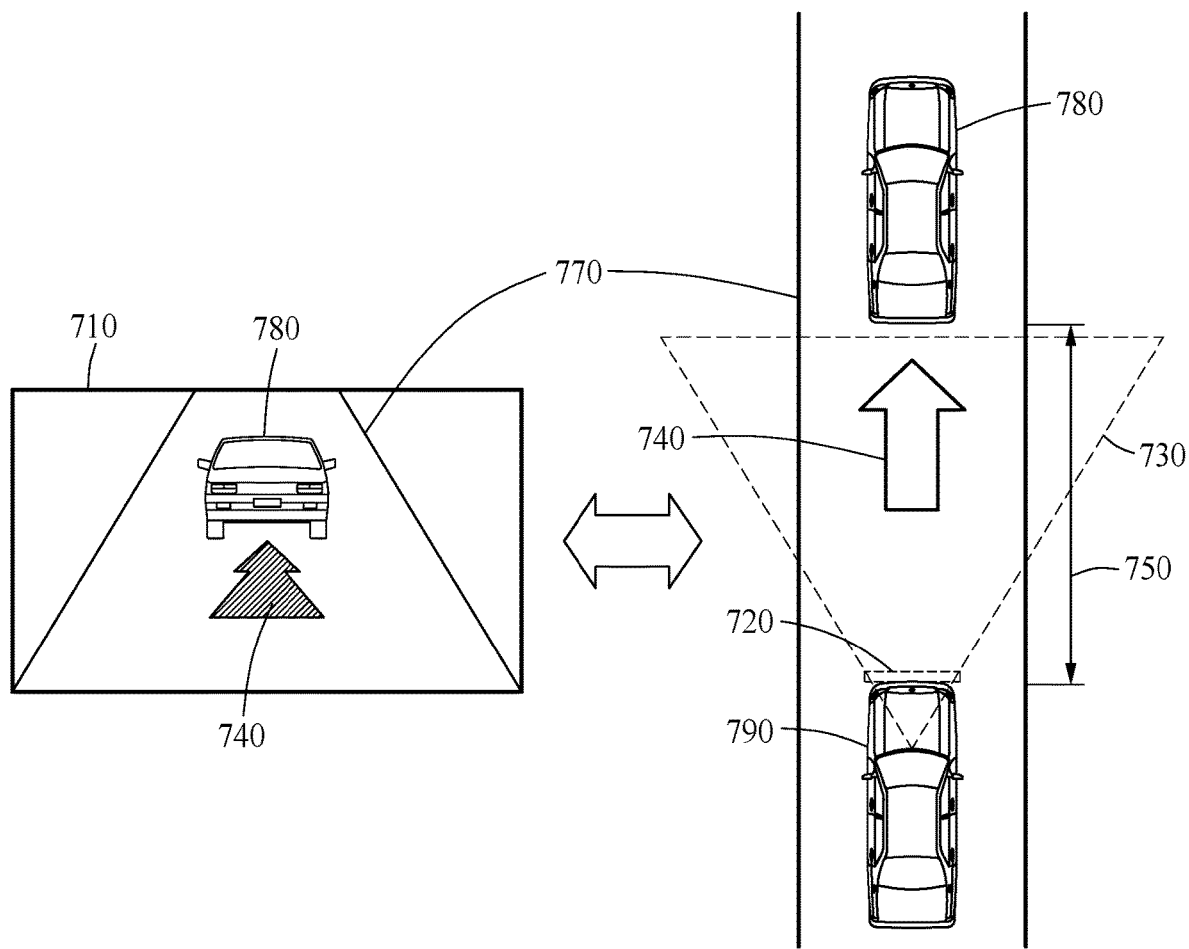
FIG. 7 illustrates a depth at which content is to be visualized according to an exemplary embodiment.

FIG. 7 illustrates a depth at which content is to be visualized according to an exemplary embodiment.

A content visualizing device may limit a depth at which content 740 is to be visualized to be less than a distance 750 from the content visualizing device to an object 780. For example, the content visualizing device may determine a depth of a virtual region 730 in which the content 740 is to be visualized to be a depth less than the distance 750 to the object 780. The virtual region 730 may be determined based on a positional relationship between a user and a projection plane 720 formed by an HUD, and the depth of the virtual region 730 may be limited by a processor of the content visualizing device.

The content visualizing device may visualize the content 740 in the virtual region 730. As described above, the content visualizing device may visualize the content 740 to be a stereoscopic graphic representation through the projection plane 720. As shown on a left side of FIG. 7, the content 740 may be visualized behind the preceding object 780 to be overlaid on an actual road 770 in a visual field 710 of the user. FIG. 7 illustrates the content 740 including an arrow corresponding to an indication indicating that a vehicle 790 should go straight based on driving information. However, exemplary embodiments are not limited thereto.

Figure 8:
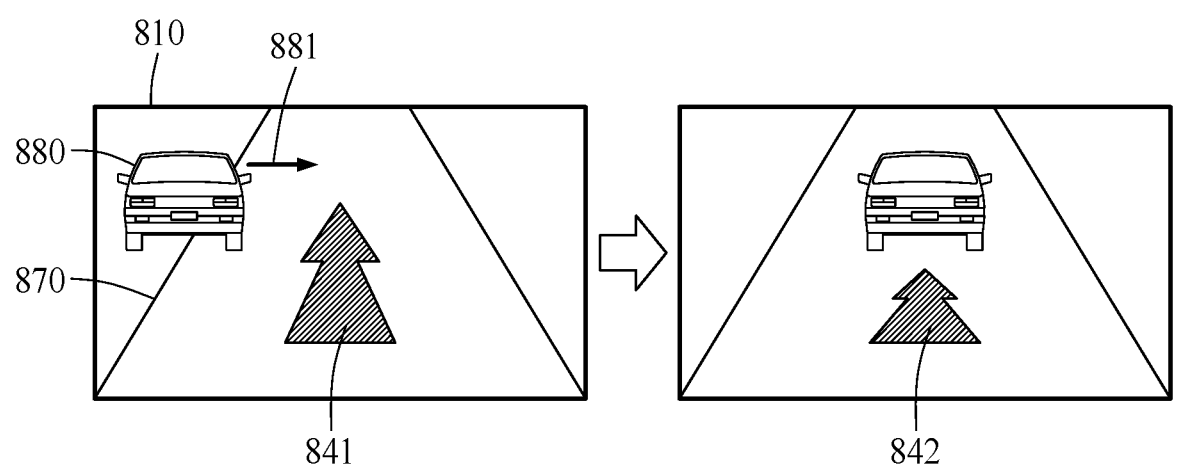
FIG. 8 illustrates an example of adjusting visualized content according to an exemplary embodiment.

FIG. 8 illustrates an example of adjusting visualized content according to an exemplary embodiment.

A processor of a content visualizing device may change a region in which content is to be visualized in response to any one of a change in a distance to an object 880 and a horizontal movement of the object 880 or a combination of the change in a distance to an object 880 and the horizontal movement of the object 880. For example, an object detector of the content visualizing device may monitor a surrounding situation in real time, and the processor of the content visualizing device may model a surrounding environment as a 3D space.

The content visualizing device may determine a position, a depth, and a size range of a virtual region to visualize natural content without causing an overlap with the actual object 880, based on information related to the surrounding environment monitored in real time and modeled.

As shown in FIG. 8, in a case in which the content visualizing device is mounted on a vehicle, content 841 including driving information may be visualized to be a stereoscopic graphic representation to be overlaid on a road 870 during driving. In a case in which the preceding object 880 cuts in a lane on which the vehicle is being driven, the content visualizing device may measure and predict movement information 881 of the preceding object 880, for example, a velocity of the preceding object 880, a direction of the preceding object 880, and a distance from the preceding object 880 to the vehicle. Further, the content visualizing device may obtain vehicle information including a velocity and a direction of the vehicle. The content visualizing device may change a position, a depth, and a size of a virtual region based on the movement information 881 and the vehicle information such that the actual object 880 may not overlap the content 841. In addition, the content visualizing device may visualize content 841 based on a different size, a different position, a different depth, and a different shape.

In a case in which the preceding object 880 cuts into a path of the content visualizing device, the content visualizing device may reduce the size of the content 841 and change the shape of the content 841 as shown in FIG. 8, thereby preventing an overlap between the content 842 and the object 880 in a visual field 810 of a user.

Figure 9:
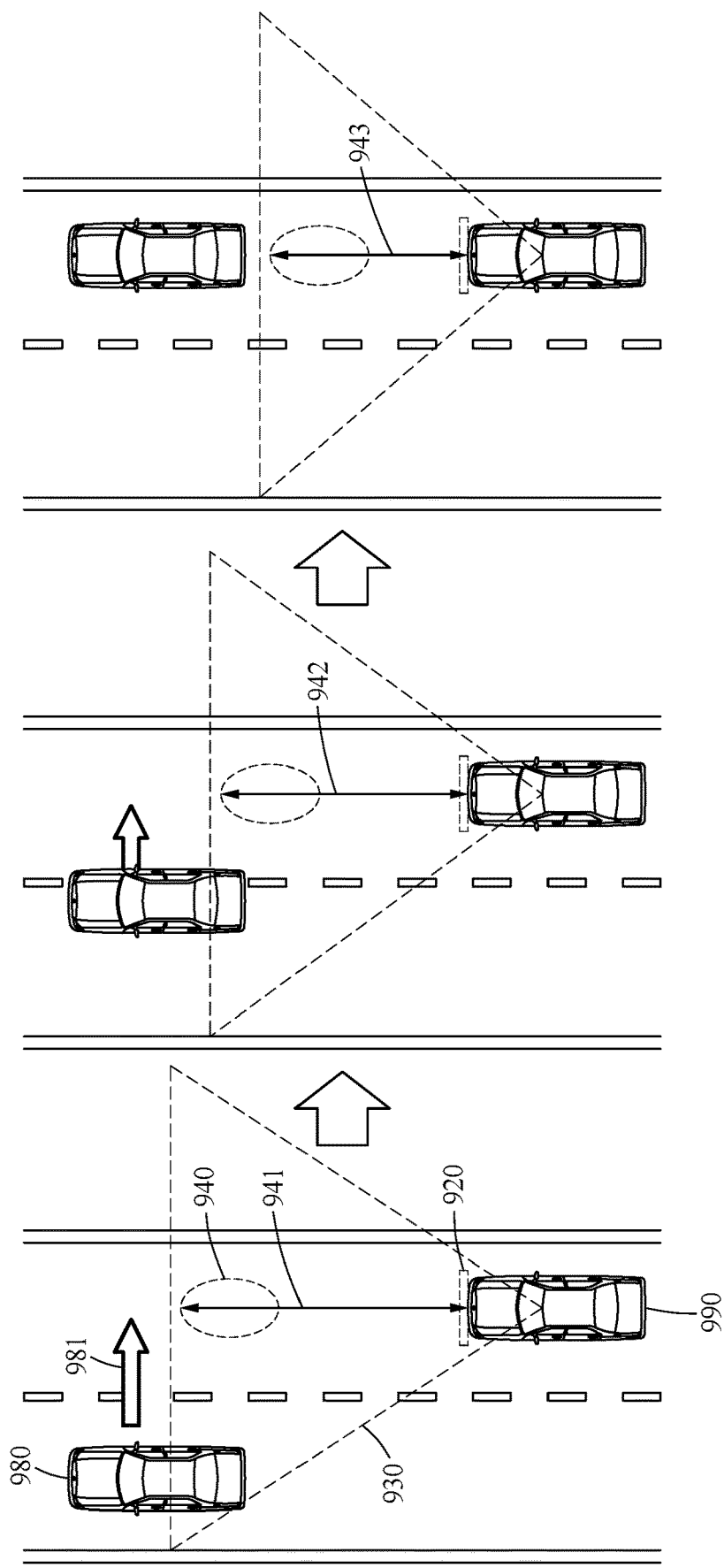
FIG. 9 illustrates an example of gradually adjusting visualized content according to an exemplary embodiment.

FIG. 9 illustrates an example of gradually adjusting visualized content according to an exemplary embodiment.

A processor of a content visualizing device may predict a movement 981 of an object 980, and gradually change any one or any combination of a position, a depth, a size, and a shape of content 940 based on the predicted movement 981.

For example, FIG. 9 illustrates a situation in which the content visualizing device predicts the movement 981 of the preceding object 980 about to move to a lane on which a vehicle 990 is currently being driven.

The content visualizing device may visualize the content 940 in a virtual region 930. There is no obstacle in front of the vehicle 990 until the object 980 cuts in the lane. Thus, the content visualizing device may visualize the content 940 at a depth up to a first depth 941 through a projection plane 920.

The content visualizing device may sense the movement 981 of the object 980 on a next lane about to move to the lane on which the vehicle 990 is currently being driven. The content visualizing device may gradually change a depth of the virtual region 930 in which the content 940 is to be visualized based on the predicted movement 981. For example, the content visualizing device may change the depth at which the content 940 is to be visualized to a second depth 942. The second depth 942 may be less than the first depth 941. As shown in FIG. 9, the second depth 942 may be greater than a distance between the object 980 and the vehicle 990. The second depth 942 may be less than the first depth 941, and greater than a third depth 943.

The content visualizing device may change the depth at which the content 940 is to be visualized to the third depth 943 until the object 980 completely enters the lane on which the vehicle 990 is currently being driven. The third depth 943 may be determined to be less than the distance between the object 980 and the vehicle 990.

Thus, the content visualizing device may gradually change the depth at which the content 940 is to be visualized based on the predicted movement 981 of the object 980, thereby naturally changing the content 940. The content visualizing device may adjust the depth of the virtual region 930 to be a depth less than the distance to the object 980, thereby finally preventing a special overlap between the content 940 and the object 980.

FIG. 9 illustrates an example in which the content visualizing device gradually adjusts the depth of the content 940 in response to the movement 981 of the object 980. However, exemplary embodiments are not limited thereto. For example, the content visualizing device may gradually change the position, the size, and the shape of the content 940, in addition to the depth, thereby naturally adjusting the content 940.

Figure 10:
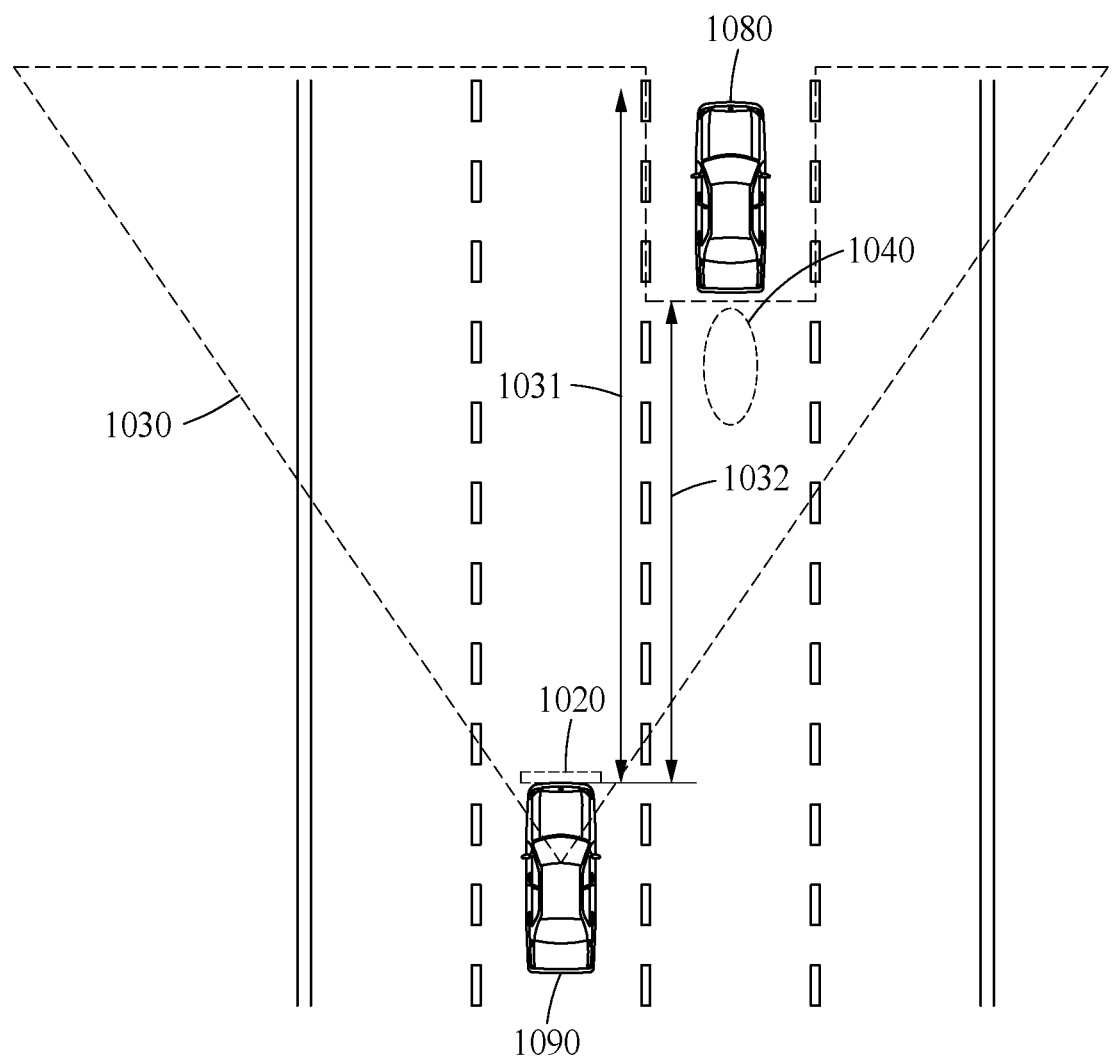
FIG. 10 illustrates an example of dynamically adjusting a depth at which content is to be visualized according to an exemplary embodiment.

FIG. 10 illustrates an example of dynamically adjusting a depth at which content is to be visualized according to an exemplary embodiment.

A processor of a content visualizing device may limit a depth at which content 1040 is to be visualized with respect to a region in which an object 1080 is detected, and maintain the depth at which the content 940 is to be visualized with respect to a region in which the object 1080 is not detected.

For example, in a case in which the content visualizing device is mounted on a vehicle 1090, the processor may change the depth at which the content 1040 is to be visualized with respect to a region corresponding to a lane on which the object 1080 is positioned, and maintain the depth at which the content 1040 is to be visualized with respect to a region corresponding to a remaining lane.

As shown in FIG. 10, the content visualizing device may determine a virtual region 1030 to have a default depth 1031. The content visualizing device may visualize the content 1040 in the virtual region 1030 through a projection plane 1020.

The content visualizing device may change the depth at which the content 1040 is to be visualized from the default depth 1031 to a limited depth 1032 with respect to the region corresponding to the lane on which the object 1080 is detected.

As described above, the content visualizing device may dynamically adjust the depth at which the content 1040 is to be visualized with respect to the region in which the object 1080 is detected, in the virtual region 1030 corresponding to a visual field of a user. The content visualizing device may dynamically adjust the depth at which the content 1040 is to be visualized based on whether the object 1080 is detected, thereby providing the user with more natural MR.

Figure 11:
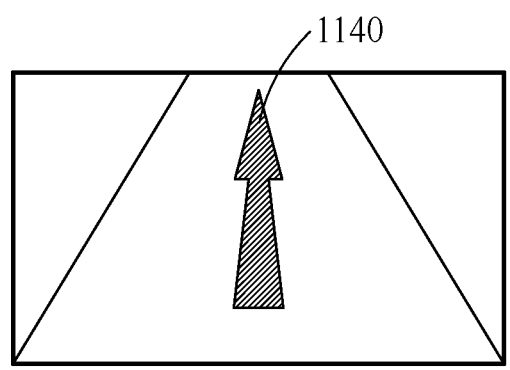
FIGS. 11 and 12 illustrate an example of changing visualized content based on a state of a vehicle according to an exemplary embodiment.
Figure 12:
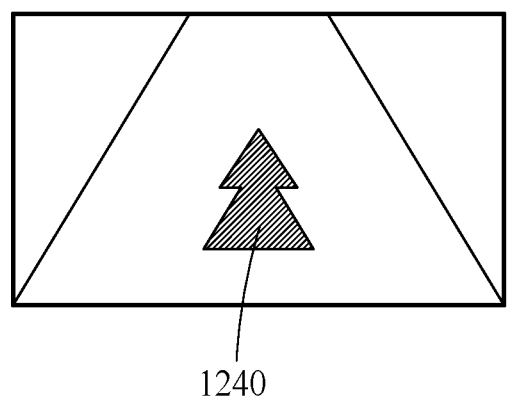

FIGS. 11 and 12 illustrate an example of changing visualized content based on a state of a vehicle according to an exemplary embodiment.

In a case in which a content visualizing device is mounted on a vehicle, a processor of the content visualizing device may change any one of a position, a size, and a shape of content based on vehicle information of the vehicle or any combination of a position, a size, and a shape of content based on vehicle information of the vehicle. The vehicle information may be information related to a state of the vehicle, and may include, for example, velocity information, acceleration information, direction information, steering information, and position information of the vehicle. However, according to another embodiment, the change may not be limited to a position, a size, and a shape of the content.

For example, a visual field of a user may be limited based on a velocity of the vehicle. In general, the user has a relatively narrow visual angle during fast driving. Thus, the content visualizing device may visualize content having a different depth in a virtual space based on the velocity information of the vehicle. In a case in which the vehicle is being driven fast, the content visualizing device may generate a graphic representation with a narrow width and a great depth, as shown in content 1140 of FIG. 11. Conversely, in a case in which the vehicle is being driven slow, the content visualizing device may generate a graphic representation with a wide width and a shallow depth, as shown in content 1240 of FIG. 12.

Figure 13:
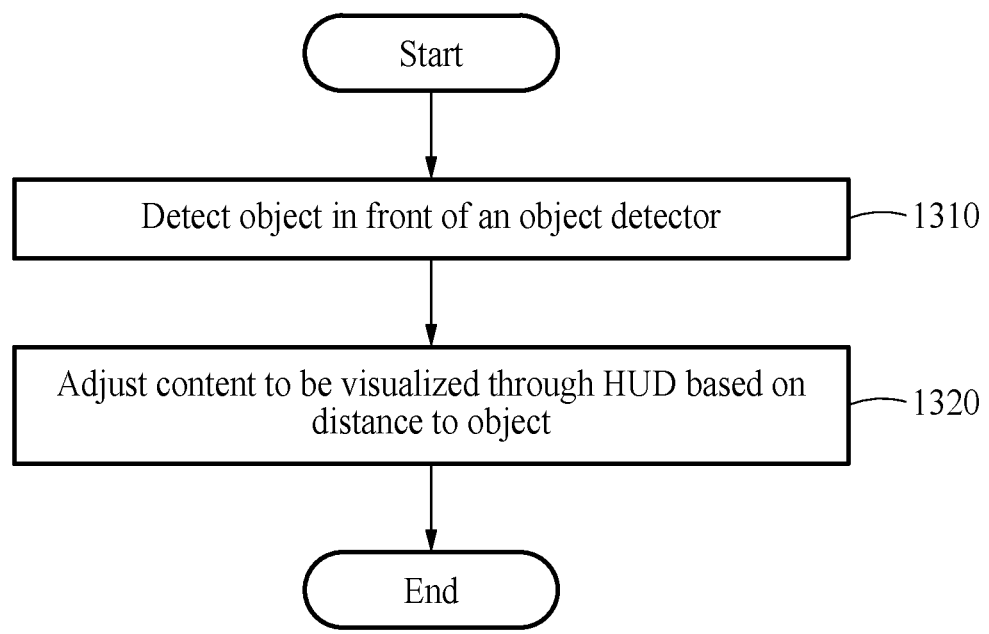
FIGS. 13 and 14 are flowcharts illustrating a content visualizing method according to an exemplary embodiment.
Figure 14:
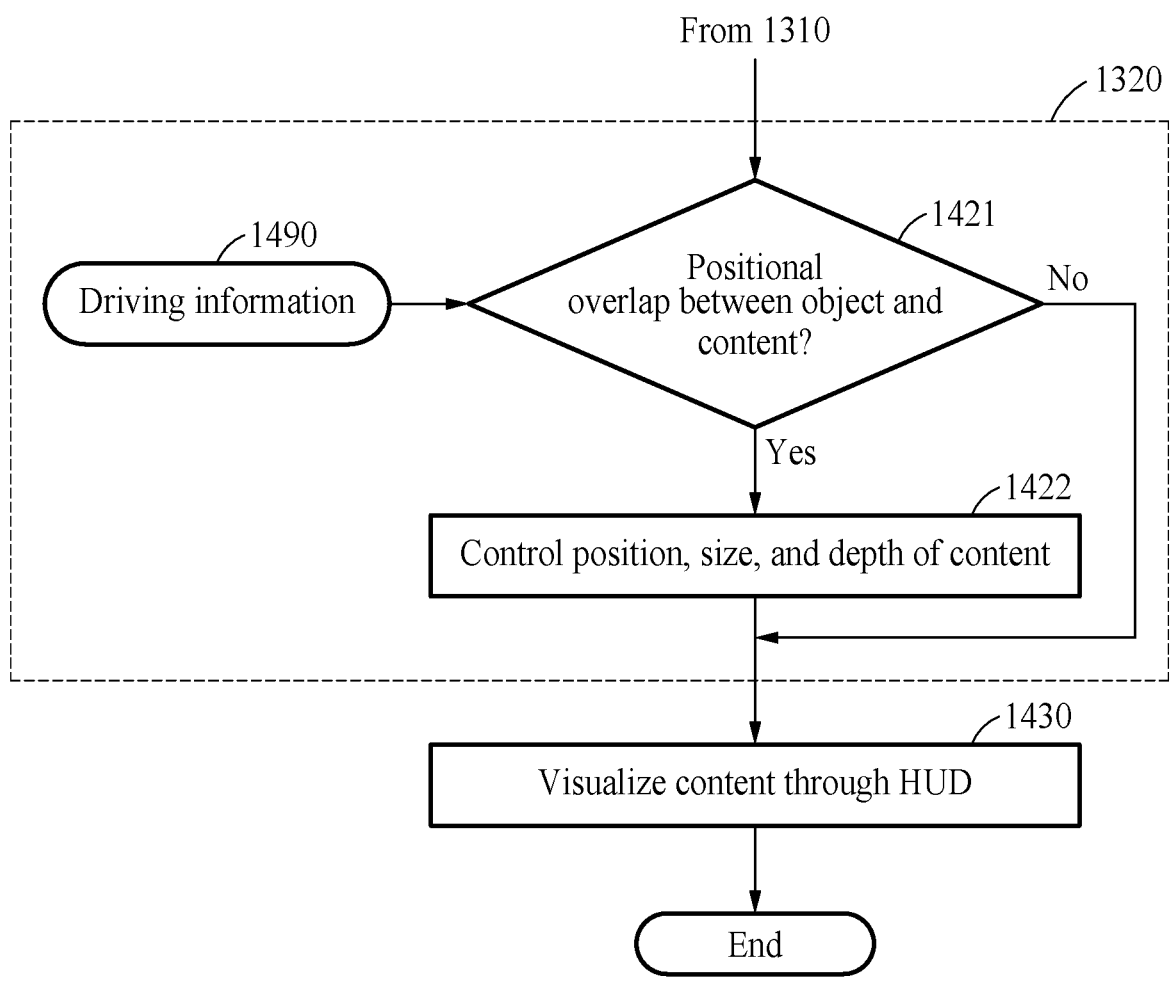

FIGS. 13 and 14 are flowcharts illustrating a content visualizing method according to an exemplary embodiment.

FIG. 13 is a flowchart illustrating a content visualizing method.

Referring to FIG. 13, in operation 1310, a content visualizing device may detect an object in front of an object detector. For example, the content visualizing device may measure or estimate a distance to the object in front of a user, a shape of the object, and a size of the object.

In operation 1320, the content visualizing device may adjust content to be displayed through an HUD based on the distance to the object. For example, the content visualizing device may adjust a depth of a virtual region in which the content is to be visualized, thereby preventing an overlap between the content and the object, as described with reference to FIGS. 1 through 12.

FIG. 14 is a flowchart illustrating a content visualizing method considering driving information.

Referring to FIG. 14, in operation 1421, the content visualizing device may determine whether a positional overlap between the object and the content occurs based on driving information 1490. For example, the content visualizing device may predict a movement of the object and determine whether the distance to the object in front of an object detector from operation 1310 is less than a depth of the content. In a case in which the content visualizing device is mounted on a vehicle, the content visualizing device may determine whether an overlap between the content and the object is to occur, based on the current driving information 1490 of the vehicle and information related to the position of the object which cuts in and the distance to the object. In a case in which the distance between the user and the object is less than the depth of the content, the content visualizing device may determine that the positional overlap between the object and the content occurs.

In response to determination that the positional overlap between the object and the content occurs, the content visualizing device may control the position, the size, and the depth of the content, in operation 1422. For example, the content visualizing device may control the position, the depth, and the size of the content such that the object which cuts in may not overlap the content. Further, the content visualizing device may gradually reduce the depth and the size of the content. The content visualizing device may determine, based on the movement of the object and the current driving information 1490 of the vehicle, variances in the position, the size, and the depth of the content per unit time.

In operation 1430, the content visualizing device may visualize the content through the HUD. For example, the content visualizing device may form a projection plane through the HUD, thereby providing the user with the content as a stereoscopic graphic representation.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A content visualizing device comprising:
an object detector configured to detect an object in front of the object detector; and
a processor configured to:
control a head-up display (HUD) to form a single projection plane including a left image and a right image on which content is stereoscopically rendered in a 3-dimensional (3D) space in front of a user by providing the left image to a left eye of the user and the right image to a right eye of the user;
determine that a positional overlap between the object and the content occurs in response to a distance to the object in from of the object detector being less than a depth of the content; and
limit, in response to the positional overlap occurring between the object and the content, a depth at which the content is displayed through the HUD to be less than a distance from the object detector to the object, by changing a disparity between a first graphic representation included in the left image for the content and a second graphic representation included in the right image for the content.

2. The content visualizing device of claim 1, further comprising:
the HUD configured to form the projection plane,
wherein the processor is further configured to determine the depth at which the content is to be visualized based on the projection plane.

3. The content visualizing device of claim 1, wherein the processor is further configured to:
adjust, in a first region in which the object is detected, the depth at which the content is to be visualized, and
maintain, in a second region in which the object is not detected, the depth at which the content is to be visualized.

4. The content visualizing device of claim 1, wherein the processor is further configured to change a region in which the content is to be visualized in response to at least one of a change in the distance from the object detector to the object and a horizontal movement of the object.

5. The content visualizing device of claim 1, wherein the processor is further configured to change at least one of a position, a size, and a shape of the content based on vehicle information of a vehicle, in response to the content visualizing device being mounted on the vehicle.

6. The content visualizing device of claim 1, wherein the processor is further configured to predict a movement of the object, and gradually change at least one of a position, the depth, a size, and a shape of the content based on the predicted movement.

7. The content visualizing device of claim 1, wherein the object detector comprises a depth sensor configured to measure the distance from the object detector to the object.

8. The content visualizing device of claim 1, wherein the processor is further configured to:
change the depth at which the content is to be visualized with respect to a first region corresponding to a first lane on which the object is positioned, in response to the content visualizing device being mounted on a vehicle, and
maintain the depth at which the content is to be visualized with respect to a second region corresponding to a second lane different from the first lane.

9. A content visualizing method comprising:
detecting, by an object detector, an object in front of the object detector;
controlling a head-up display (HUD) to form a single projection plane including a left image and a right image on which content is stereoscopically rendered in a 3-dimensional (3D) space in front of a user by providing the left image to a left eye of the user and the right image to a right eye of the user;
determining that a positional overlap between the object and the content occurs in response to a distance to the object in front of the object detector being less than a depth of the content; and
limiting, in response to the positional overlap occurring between the object and the content, a depth at which the content is displayed through the HUD to be less than a distance from the object detector to the object, by changing a disparity between a first graphic representation included in the left image for the content and a second graphic representation included in the right image for the content.

10. The content visualizing method of claim 9, wherein the adjusting the depth at which the content is displayed comprises:
forming the projection plane through the HUD; and
determining the depth at which the content is to be visualized based on the projection plane.

11. The content visualizing method of claim 9, wherein the adjusting the depth at which the content is displayed comprises:
adjusting, in a first region in which the object is detected, the depth at which the content is to be visualized; and
maintaining, in a second region in which the object is not detected, the depth at which the content is to be visualized.

12. The content visualizing method of claim 9, wherein the adjusting the depth at which the content is displayed comprises changing a region in which the content is to be visualized in response to at least one of a change in the distance from the object detector to the object and a horizontal movement of the object.

13. The content visualizing method of claim 9, wherein the adjusting the depth at which the content is displayed comprises changing at least one of a position, a size, and a shape of the content based on vehicle information of a vehicle.

14. The content visualizing method of claim 9, wherein the adjusting the depth at which the content is displayed comprises predicting a movement of the object, and gradually changing at least one of a position, the depth, a size, and a shape of the content based on the predicted movement.

15. The content visualizing method of claim 9, wherein the detecting the object comprises measuring the distance from the object detector to the object.

16. The content visualizing method of claim 9, wherein the adjusting the depth at which the content is displayed comprises:
changing the depth at which the content is to be visualized with respect to a first region corresponding to a first lane on which the object is positioned; and maintaining the depth at which the content is to be visualized with respect to a second region corresponding to a second lane different from the first lane.

* * * * *